April 10, 1962    D. BRAUN    3,028,743
SUCTION STRIPPING ARRANGEMENT FOR TRANSPORTING ROLLERS
Filed Dec. 19, 1960
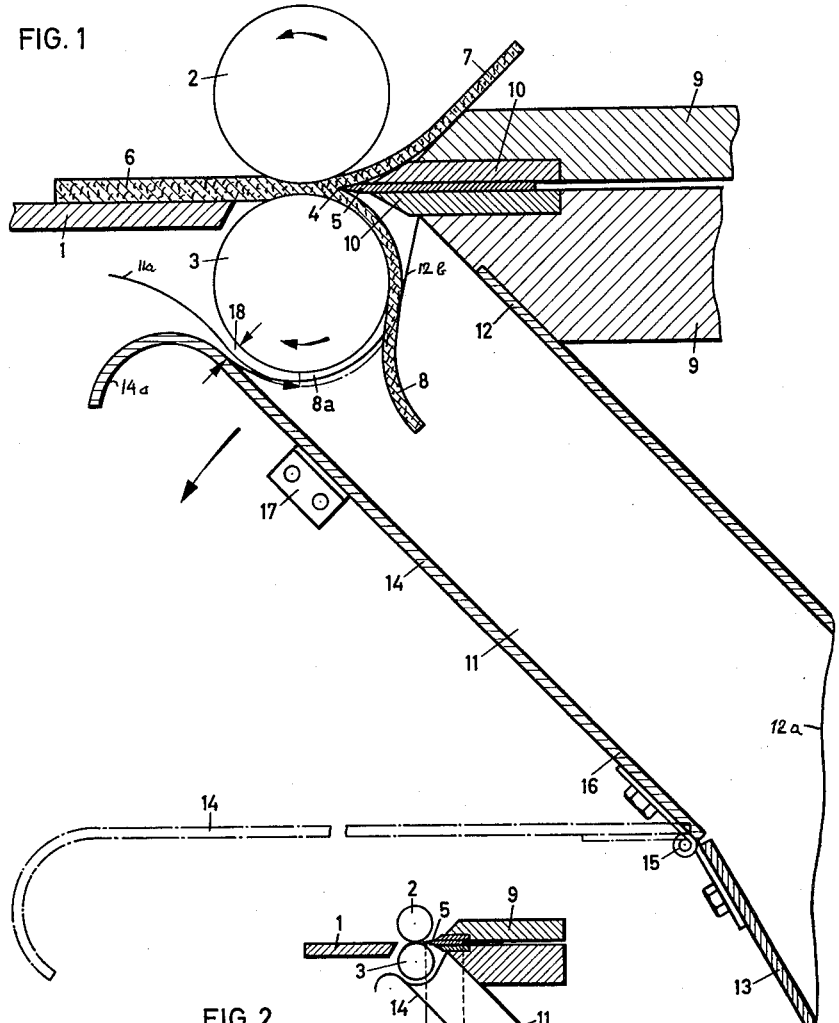
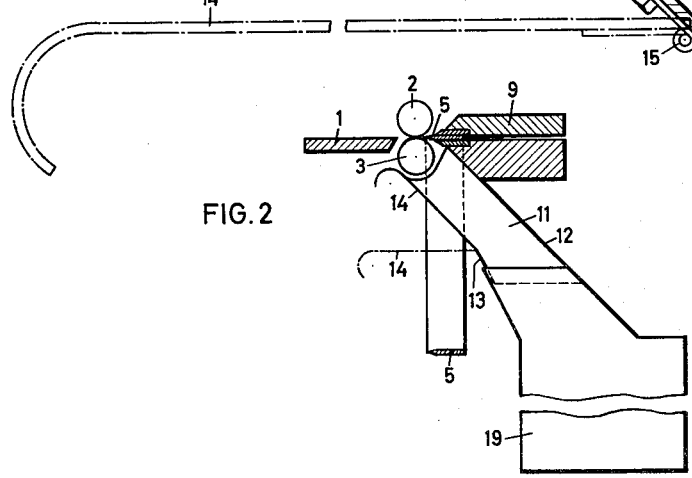

United States Patent Office 3,028,743
Patented Apr. 10, 1962

3,028,743
SUCTION STRIPPING ARRANGEMENT FOR TRANSPORTING ROLLERS
Dieter Braun, Stutigart-Bad Cannstatt, Germany, assignor to Fortuna-Werke Spezialmaschinenfabrik A.G., Stuttgart-Bad Cannstatt, Germany
Filed Dec. 19, 1960, Ser. No. 76,568
Claims priority, application Germany Dec. 17, 1959
10 Claims. (Cl. 69—10)

The present invention relates to a suction stripping arrangement for transporting rollers, and more particularly to a suction stripping arrangement for stripping the transporting roller of a leather splitting machine off waste leather material adhering thereto.

In the shoe industry machines are used by which thin leather sheets are split into a layer of uniform thickness which is used for the uppers of shoes, and into a waste part which may include small strips, pieces, or particles of leather. In machines of this type, the workpiece is transported between an adjustable abutment roller, and a lower resiliently supported pressure roller to move in a plane in which a cutting tool, usually a moving cutter band is located. The used layer of the leather sheet is guided upwardly over the cutting tool, while the waste parts are guided downwardly under the plane of the cutting tool. Such waste parts soil and clog the interior of the machine casing, and it is customary to collect the waste parts in a chute by which they are guided to a suitable receptacle. However, some waste parts are thin strips or layer portions which tend to adhere to the transporting roller, particularly due to electrostatic charges, and are consequently wound up on the transporting roller where they interfere with the transporting function of the roller.

It has been attempted to remove such adhering waste parts from the transporting roller by rotary brushes, or by blowers. However, brushes are soon filled with waste particles and ineffective, while blowers have been found unsuitable since the waste particles are blown to other parts of the machine and into the workshop.

It is one object of the present invention to overcome the disadvantages of known arrangements for removing waste particles from transporting devices, and to provide a suction stripping arrangement by which transporting rollers are cleaned by an airstream produced by suction.

Another object of the present invention is to provide a suction stripping arrangement in which a stream of air is guided in tangential direction against the surface of a transporting roller so that waste particles adhering to the roller and being wound up by the same, are stripped from surface of the roller.

Another object of the present invention is to place the inlet portion of a suction duct in the close proximity of a transporting roller of a cutting machine in such a manner that air can enter the inlet portion only through a small gap extending in tangential direction of the transporting roller so that waste material adhering to the transporting roller in the region of the gap is stripped off the roller.

With these objects in view, the present invention is concerned with a suction stripping arrangement which comprises a cutting tool means, such as a moving cutter band; a transporting roller, preferably resiliently mounted, for transporting a material or workpiece, such as a leather sheet to the cutting tool; and a suction duct having an inlet portion with a wall end portion extending parallel to a tangent on a peripheral surface portion of the transporting roller and defining a narrow gap with the transporting roller.

When the transported sheet is split by the cutter band, the layer which is to be used is located on one side of the cutter band, while waste parts pass to the other side of the cutter band, and tend to adhere to, and to be wound up on the transporting roller to move toward and into the gap. The holder of the cutter band, the good layer of the cut sheet, and the transporting roller close the inlet portion of the suction duct except for the gap through which all the air enters at high velocity, moving in tangential direction along the roller whose surface moves in the gap in a direction opposite to the flow direction of the air. In this manner, waste material adhering to the roller and moving in the gap opposite to the direction of the air flow, is stripped off the transporting roller.

The rapid moving air stream in the gap effectively strips all waste parts adhering to the transporting rollers from the same so that the waste parts are sucked into the duct, and are sucked into same. Of course, smaller pieces which are torn off or cut off the workpiece are directly sucked into the suction duct. In order to obtain a smooth flow of the air into the gap, it is preferred to provide a curved extension of the gap-forming wall end portion of the suction duct, and it is particularly advantageous to make such extension part-circular to have substantially the same radius as the transporting roller so that the air flows into a gradually tapering guide formed by the roller and by the wall extension before it enters the gap. In this manner, turbulence and a "peeling-off" of the air from the wall of the inlet duct is prevented.

The rear wall is directly connected to the holder of the cutting tool and extends transverse to the working plane in which the workpiece is transported.

The novel features which are considered as characteristic for the invention are set forth in particular in the appended claims. The invention itself, however, both as to its construction and its method of operation, together with additional objects and advantages thereof, will be best understood from the following description and specific embodiments when read in connection with the accompanying drawing, in which:

FIG. 1 is a fragmentary cross-sectional view illustrating one embodiment of the invention; and FIG. 2 is a fragmentary schematic side elevation, partially in section, and illustrating the arrangement on a smaller scale.

Referring now to the drawing, a supporting table 1 defines a working plane in which a workpiece, for example in the form of a leather sheet 6 is moved toward a pair of transporting rollers 2 and 3. Roller 2 is turnably mounted on a fixed support, while roller 3 is resiliently mounted and is capable of yielding when thicker portions of the workpiece 6 pass between the rollers 2 and 3. A cutting tool in the form of a cutter band 5 moves between the holder parts 9 in the working plane, and splits the workpiece into a useable layer 7 of uniform thickness, and into a waste part 8. Guide parts 10 are mounted in holder 9 and have inclined faces for guiding the split parts of the workpiece, and holder parts 9 have corresponding inclined faces.

A suction duct 11 is arranged below the working plane and has an inlet portion located in the region of the transporting roller 3. The rear wall 12 of the suction duct 11 is secured to the lower holder part 9, and is arranged to continue the inclined surfaces of the lower holder members 9 and 10. A surface portion of roller 3 is located opposite the inclined surfaces of the holder members 9 and 10, and the rear wall 12 is inclined to the horizontal at such an angle as to extend parallel to a tangent of this surface portion of the roller 3. A pair of side walls 12a is secured to rear wall 12 and extends at right angles to the same. The upper ends of side wall 12a have curved edges 12b which are located in close proximity to the ends of roller 3 and follow the contour of the same.

The front wall 13 includes an upper wall end portion 14 which is secured at its lower end 16 by hinge means 15 to the fixed front wall portion 13. Suction duct 11 extends into collecting container 19 to which the inlet of an exhauster, not shown, is connected so that suction is applied to suction duct 11.

The displaceable end portion 14 of the inlet portion of the suction duct has lateral edges which are slideable on side walls 12a and preferably provided with sealing means. The upper end of the wall 14 has a curved extension 14a, illustrated to be part-circular, and having substantially the same radius of curvature as roller 3, or a somewhat greater radius.

A resilient arresting catch means 17 holds wall end portion normally in the position shown in solid lines in which wall 14 extends parallel to a tangent on the peripheral surface of roller 3 which is located opposite wall 14. In this position, wall 14 defines a narrow gap 18 with the peripheral surface of the roller.

Since the work table 1, the workpiece 6, the layer 7, the cutter band 5 and the holder 9 extend across the inlet of suction duct 11, all the air which is sucked into the suction inlet portion, must pass through the narrow gap 18 which extends along the entire axial length of roller 3. Roller 3 rotates in the direction of the narrow to transport the workpiece towards the cutter band 5, and consequently the gap-forming surface portion of roller 3 moves in a direction opposite to the direction of the air which is drawn through the gap 18 into the suction duct, as indicated by arrow 11a. The surface roller 3, and a curved extension 14a form a guide for the air so that the same enters gap 18 without turbulence. Due to the fact that all the air must pass throughout narrow gap 18, the velocity of the air is very high in gap 18 as compared with its velocity in the main portion of duct 11. Furthermore, the air moves in the gap in tangential direction to the peripheral surface and consequently exerts a stripping action on waste particles adhering to the roller and being carried into the gap. During operation, a leather sheet is split by the cutter band 5, and while a great part of 8 of the waste layer may directly pass into suction duct 11, some waste particles, pieces, or strips 8a adhere to the roller surface, and are carried toward the gap. However, the rapidly moving air stream 11a strips such particles from the roller so that they are sucked into the suction duct 11. In the event that even part 8 tends to be wound up on the roller, it will be blown off in the gap 18, and returned to the position illustrated in the drawing.

In the event that under special circumstances which do not normally occur, the gap 18 is clogged by waste material, the displaceable portion 14 is released by the resilient arresting means 17, and falls to the position illustrated in broken lines, which may actuate a warning signal calling the operator's attention to the machine.

Furthermore, the displaceable wall portion 14 may be opened by the operator for the purpose of removing pieces of the material falling into the suction duct. The examination of the rejected parts of the workpiece is particularly necessary at the beginning of an operation with a new workpiece when the machine is set and adjusted to the operation.

Due to the fact that the front and rear walls of the suction duct 11 are substantially parallel to each other, and also parallel to tangents on substantially diametrically located points of the roller 3, the waste parts of the material flow freely and easily into the suction duct. Particularly, the tangential direction of the front wall portion 14 results in a gap 18 which has the greatest possible effective length and covers the greatest possible arc of the peripheral surface of the roller 3. Consequently, the high velocity air stream in the gap 18 is effective over a substantial portion of the peripheral surface of roller 3.

Since roller 3 is resiliently mounted, and yields when the thickness of the workpiece 6 varies, the width of gap 18 varies slightly during the operation. In a modified embodiment of the invention, the displaceable wall portion 14 is connected to the movable support of roller 3, and moves with roller 3 whenever the same is displaced by the workpiece and the support of roller 3 resiliently yields. In this manner, the width of the gap 18 remains constant even if roller 3 is displaced. During such movement of the wall end portion 14, its lateral edges remain in sealing engagement with the inner surfaces of the side walls 12a.

It will be understood that each of the elements described above, or two or more together, may also find a useful application in other types of arrangements for stripping rollers from material adhering thereto differing from the types described above.

While the invention has been illustrated and described as embodied in a suction stripping arrangement in which air is guided in tangential direction through a narrow gap adjacent a transporting roller which transports a leather sheet toward a splitting cutter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A suction stripping arrangement comprising, in combination, a cutting tool means; a roller rotating for transporting a material to said cutting tool whereby the material is cut and partly wound up on said roller; and a suction duct having an inlet portion including a wall with an end portion extending parallel to a tangent on a peripheral surface portion of said roller moving opposite to the direction of the flow of air in said inlet portion, said end portion defining a narrow gap with said surface portion; said cutting tool means, said roller, and the material between said roller and said cutting tool extending across said inlet portion of said duct whereby air is sucked mainly through said gap into said duct and moves at a high velocity in tangential direction along said surface portion so that cut material adhering to said surface portion and moving opposite to the direction of the air flow in said gap is stripped off said roller.

2. A suction stripping arrangement comprising, in combination, a cutting tool means; a roller rotating for transporting a material to said cutting tool whereby the material is cut and partly wound up on said roller; and a suction duct having an inlet portion including a wall with an end portion extending parallel to a tangent on a peripheral surface portion of said roller moving opposite to the direction of the flow of air in said inlet portion, said end portion defining a narrow gap with said surface portion and having a curved extension extending from said gap away from said roller to form with the surface of the same; a tapering inlet leading to said gap; said cutting tool means, and the material between said roller and said cutting tool extending across said inlet portion of said duct whereby air is sucked mainly through said gap into said duct and moves at a high velocity in tangential direction along said surface portion so that cut material adhering to said surface portion and moving opposite to the direction of the air flow in said gap is stripped off said roller.

3. A suction stripping arrangement comprising, in combination, a cutting tool means; a roller rotating for transporting a material to said cutting tool whereby the material is cut and partly wound up on said roller; and a suction duct having an inlet portion including a wall with an end portion extending parallel to a tangent on a peripheral surface portion of said roller moving opposite to the direction of the flow of air in said inlet portion, said end portion defining a narrow gap with said surface portion and having a curved part-circular extension having at least the same radius as said roller and extending from said gap away from said roller to form with the surface of the same a tapering inlet leading to said gap; said cutting tool means, said roller, and the material between said roller and said cutting tool extending across said inlet portion of said duct whereby air is sucked mainly through said gap into said duct and moves at a high velocity in tangential direction along said surface portion so that cut material adhering to said surface portion and moving opposite to the direction of the air flow in said gap is stripped off said roller.

4. A suction stripping arrangement comprising, in combination, a cutting tool means; a roller rotating for transporting a material to said cutting tool whereby the material is cut and partly wound up on said roller; and a suction duct having an inlet portion including a wall with an end portion extending parallel to a tangent on a peripheral surface portion of said roller moving opposite to the direction of the flow of air in said inlet portion, said end portion defining a narrow gap with said surface portion; said inlet portion of said suction duct having another wall extending to said cutting tool means so that said cutting tool means, said roller, and the material between said roller and said cutting tool extend across said inlet portion of said duct whereby air is sucked mainly through said gap into said duct and moves at a high velocity in tangential direction along said surface portion so that cut material adhering to said surface portion and moving opposite to the direction of the air flow in said gap is stipped off said roller.

5. A suction stripping arrangement comprising, in combination, a cutting tool means; a roller rotating for transporting a material to said cutting tool whereby the material is cut and partly wound up on said roller; and a suction duct having an inlet portion including a wall with an end portion extending parallel to a tangent on a peripheral surface portion of said roller moving opposite to the direction of the flow of air in said inlet portion, said end portion defining a narrow gap with said surface portion and having a curved extension extending from said gap away from said roller to form with the surface of the same a tapering inlet leading to said gap; said inlet portion of said suction duct having another wall extending to said cutting tool means so that said cutting tool means, said roller, and the material between said roller and said cutting tool extend across said inlet portion of said duct whereby air is sucked mainly through said gap into said duct and moves at a high velocity in tangential direction along said surface portion so that cut material adhering to said surface portion and moving opposite to the direction of the air flow in said gap is stripped off said roller.

6. An arrangement as set forth in claim 5 wherein said other wall extends substantially parallel to a tangent on a peripheral surface portion of said roller.

7. A suction stripping arrangement comprising, in combination, a cutting tool means; a roller rotating for transporting a material to said cutting tool whereby the material is cut and partly wound up on said roller; and a suction duct having an inlet portion including a wall with an end portion extending parallel to a tangent on a peripheral surface portion of said roller moving opposite to the direction of the flow of air in said inlet portion, said end portion defining a narrow gap with said surface portion; said inlet portion of said suction duct having another wall extending to said cutting tool means, said wall and said other wall being substantially parallel, said inlet portion further including two transverse walls parallel to each other and transverse to said first mentioned walls, said transverse walls having ends extending into close proximity with said roller so that said cutting tool means, said roller, and the material between said roller and said cutting tool extend across said inlet portion of said duct whereby air is sucked mainly through said gap into said duct and moves at a high velocity in tangential direction along said surface portion so that cut material adhering to said surface portion and moving opposite to the direction of the air flow in said gap is stripped off said roller.

8. A suction stripping arrangement comprising, in combination, a cutting tool means; a roller rotating for transporting a material to said cutting tool whereby the material is cut and partly wound up on said roller; a support rotatably supporting said roller and being resiliently mounted so that said roller can yield to irregularities of the material; and a suction duct having an inlet portion including a wall with an end portion mounted on said support for movement with the same and with said roller and extending parallel to a tangent on a peripheral surface portion of said roller moving opposite to the direction of the flow of air in said inlet portion, said end portion defining a narrow gap with said surface portion; said cutting tool means, said roller, and the material between said roller and said cutting tool extending across said inlet portion of said duct whereby air is sucked mainly through said gap into said duct and moves at a high velocity in tangential direction along said surface portion so that cut material adhering to said surface portion and moving opposite to the direction of the air flow in said gap is stripped off said roller.

9. A suction stripping arrangement for a leather splitting machine, comprising, in combination a cutting tool extending in a plane; a tool holder means supporting said cutting tool and having a lower surface inclined to said plane; a first roller and a second roller located on opposite sides of said plane for transporting a leather sheet in said plane to said cutting tool so that the sheet is split in said plane into a layer moving on the upper side of said cutting tool, and into waste material located on the lower side of said cutting tool in the region of said inclined surface of said tool holder, said waste material being partly wound up on said second roller; and a suction duct having an inlet portion including a rear wall secured to said tool holder and extending from said inclined surface substantially parallel to a tangent on a rear surface portion of said second roller, a pair of side walls extending into close proximity with said second roller, and a front wall with an end portion extending parallel to a tangent on a peripheral front surface portion of said roller, said front surface portion moving opposite to the direction of the flow of air in said inlet portion, said end portion defining a narrow gap with said front surface portion, said cutting tool, said tool holder means, and said layer of said leather sheet extending across said inlet portion whereby air is sucked through said gap into said duct and moves at a high velocity along said front surface portion so that the waste material adhering to said front surface portion and moving opposite to the direction of the flow of air in said gap is stripped off said roller.

10. A suction stripping arrangement for a leather splitting machine, comprising, in combination a cutting tool extending in a plane; a tool holder means supporting said cutting tool and having a lower surface inclined to said plane; a first roller and a second roller located on opposite sides of said plane for transporting a leather sheet in said plane to said cutting tool so that the sheet is split in said plane into a layer moving on the upper side of said cutting tool, and into waste material located on the lower side of said cutting tool in the region of said inclined surface of said tool holder, said waste material being partly wound up on said second roller; and a suction duct having an inlet portion including a rear wall secured to said tool holder and extending from said inclined surface substantially parallel to a tangent on a rear surface portion of said second roller, a pair of side walls extending into close proximity with said second roller, and a front wall with an end portion extending parallel to a tangent on a peripheral front surface portion of said roller, said front surface portion moving opposite to the direction of the flow of air in said inlet portion, said end portion defining a narrow gap with said front surface portion, said end portion having a curved extension extending from said gap away from said second roller to form with the surface of the same a tapering inlet leading to said gap, said cutting tool, said tool holder means, and said layer of said leather sheet extending across said inlet portion whereby air is sucked through said gap into said duct and moves at a high velocity along said front surface portion so that the waste material adhering to said front surface portion and moving opposite to the direction of the flow of air in said gap is stripped off said roller.

No references cited.